United States Patent [19]

Vinton

[11] 4,108,470
[45] Aug. 22, 1978

[54] SUSPENSION SYSTEM FOR TANDEM AXLE VEHICLES

[75] Inventor: David S. Vinton, Morton, Ill.

[73] Assignee: Caterpillar Tractor Co., Peoria, Ill.

[21] Appl. No.: 798,055

[22] Filed: May 18, 1977

[51] Int. Cl.² ................. B62D 61/00; B60G 11/52
[52] U.S. Cl. ............................. 280/677; 267/63 A
[58] Field of Search ............ 280/677, 681, 678, 689, 280/688, 676, 81 R, 81 A; 267/63 R, 63 A

[56] References Cited

U.S. PATENT DOCUMENTS

| 2,743,936 | 5/1956 | Bigge | 280/677 |
|---|---|---|---|
| 4,034,997 | 7/1977 | Oosterling | 280/677 |

Primary Examiner—Philip Goodman
Attorney, Agent, or Firm—James R. Bell

[57] ABSTRACT

A suspension system for tandem axle vehicles includes spaced equalizer beams interconnecting the tandem axles. Brackets resiliently interconnect the equalizer beams with spaced portions of the vehicle frame and a torque tube assembly is connected at opposite ends to the spaced portions of the vehicle frame.

6 Claims, 4 Drawing Figures

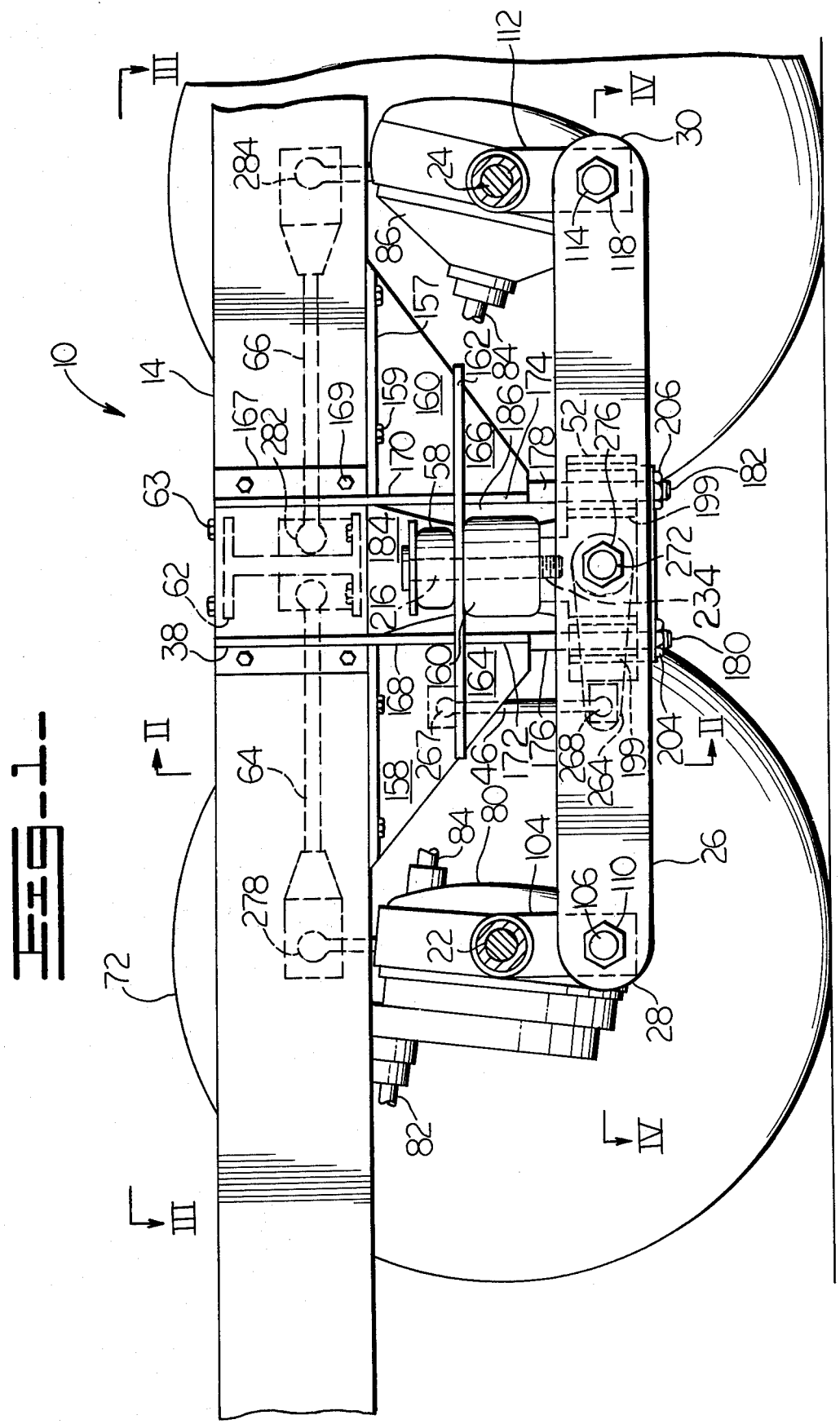

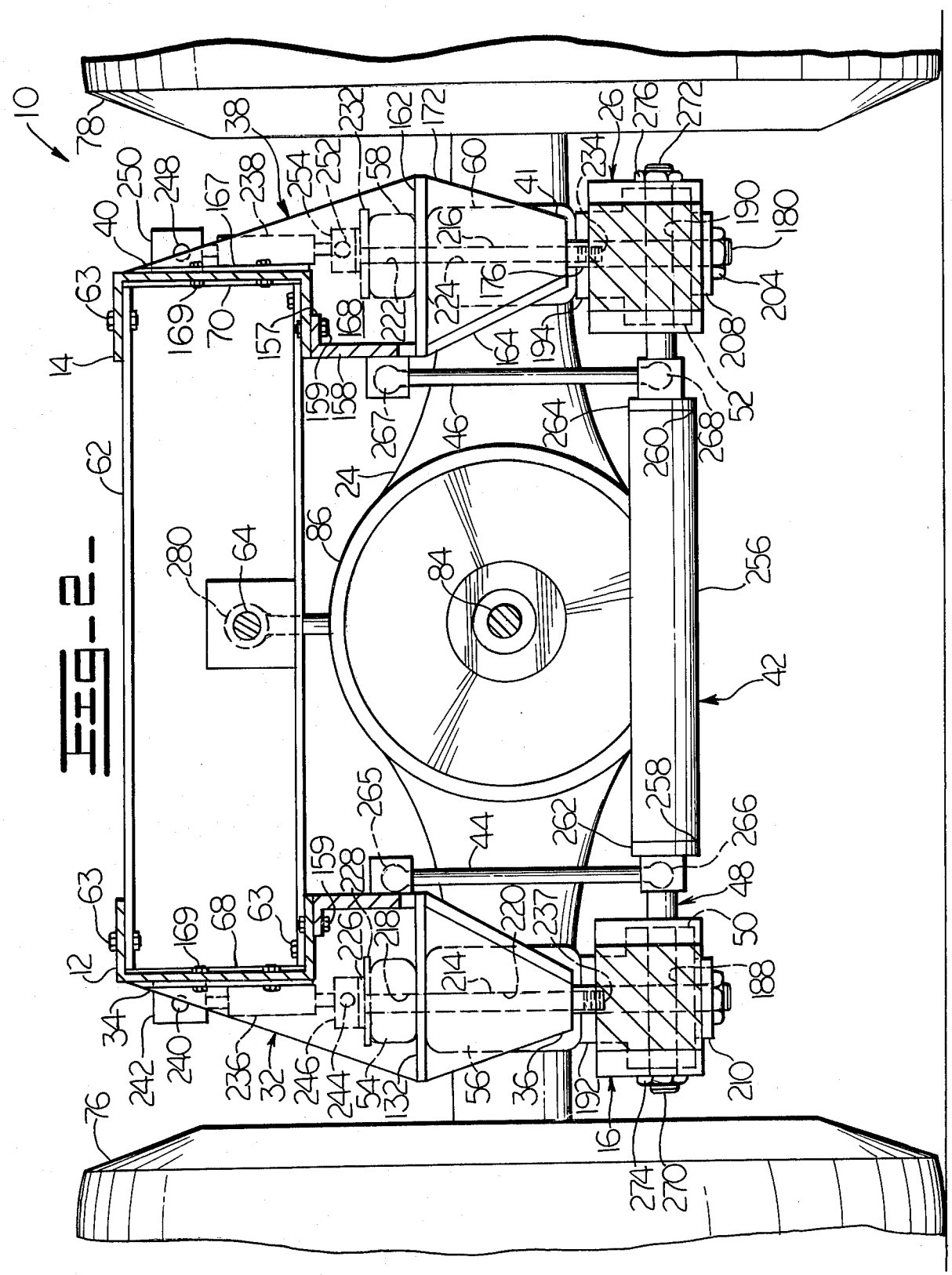

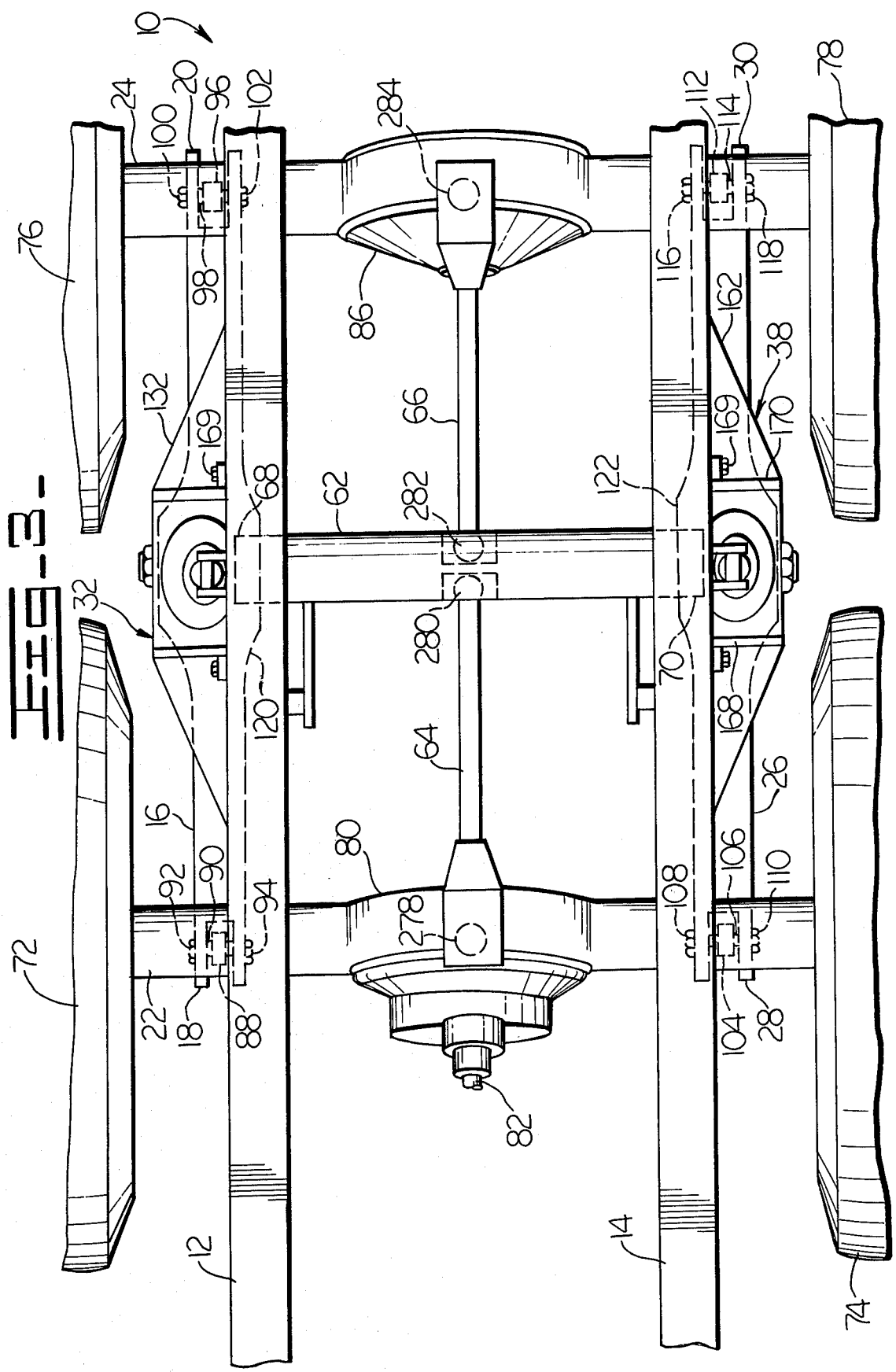

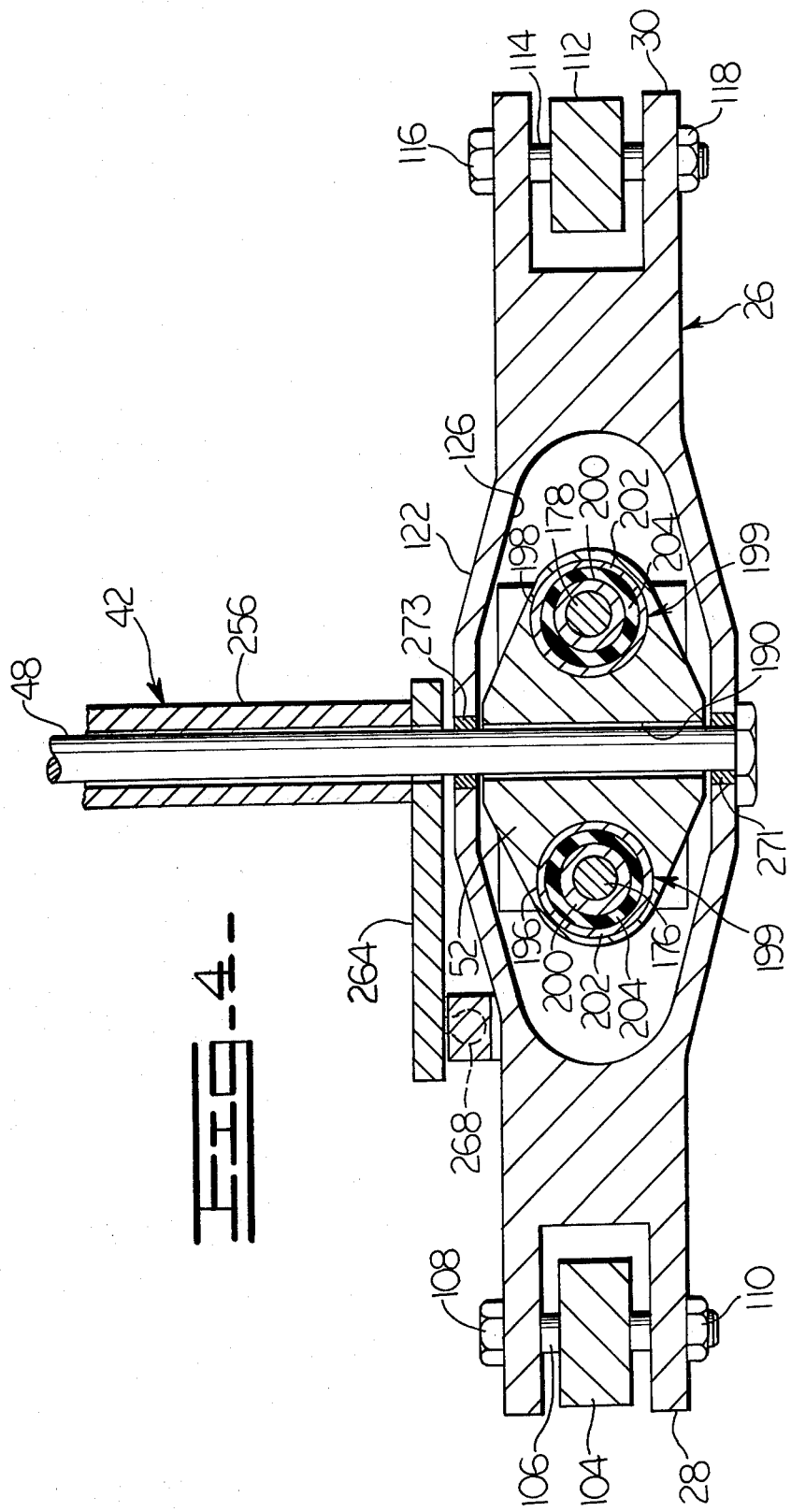

SUSPENSION SYSTEM FOR TANDEM AXLE VEHICLES

BACKGROUND OF THE INVENTION

1. Field of the Invention

This invention relates generally to land vehicles and more particularly to those of the wheeled type having tandem drive axles.

2. Description of the Prior Art

Presently, anti-roll devices are provided on single drive axles and those devices have been combined with resilient suspension members to provide vertical cushioning. Anti-roll devices are also provided for some tandem drive axles to provide some anti-roll stiffness but they may disturb the load sharing ability of the axles and they do not provide soft vertical cushioning for good ride characteristics. Insufficient anti-roll stiffness causes heavy duty vehicle tandem axles to have poor dynamic characteristics resulting in poor tracking and instability during turns. Such vehicles are generally of the class 8 type having high gross weight/high center of gravity characteristics and are primarily used for heavy hauling. Examples of such vehicles include ready mix, sanitation collection, coal haulers, construction, and the like.

In view of the above, it would be advantageous to provide a suspension system for heavy duty tandem axle vehicles having sufficient anti-roll characteristics and also having vertical softness or cushioning for good ride characteristics without disturbing desirable axle load sharing which overcomes the problems associated with the prior art.

SUMMARY OF THE INVENTION

The present invention is directed to overcoming one or more of the problems as set forth above.

According to the present invention this is accomplished by providing a suspension system for tandem axle vehicles including spaced equalizer beams interconnecting the tandem axles. Brackets are rigidly connected to spaced portions of the vehicle frame and resiliently connected to each of the equalizer beams. A torque tube assembly is connected, at its opposite ends, to the spaced portions of the vehicle frame. A crossbeam member is connected, at opposite ends thereof, to the equalizer beams and extends through the torque tube.

The foregoing and other advantages will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is a partial side elevational view illustrating the tandem axle vehicle suspension system of this invention;

FIG. 2 is an end view illustrating the suspension system taken along the line II—II of FIG. 1;

FIG. 3 is a plan view illustrating the suspension system taken along line III—III of FIG. 1; and FIG. 4 is an enlarged partial plan view illustrating the portion of the suspension system taken along line IV—IV of FIG. 1.

BRIEF DESCRIPTION OF THE PREFERRED EMBODIMENT

Referring now to the drawings, it can be seen in FIGS. 1, 2 and 3 that the suspension system of this invention is generally designated 10. A tandem axle vehicle inherently includes frame portions such as first frame portion 12 and second frame portion 14 spaced from portion 12. First equalizer beam 16 is connected at its opposite ends 18,20 to first and second tandem axles 22,24, respectively. Similarly, second equalizer beam 26 is connected at its opposite ends 28,30 to first and second tandem axles 22,24, respectively. A first bracket generally designated 32 is rigidly connected at its first end 34 to first frame portion 12 and is resiliently connected at its second end 36 to first equalizer beam 16 through a bracket support 50. Similarly, a second bracket generally designated 38 is rigidly connected at its first end 40 to second frame portion 14 and is resiliently connected at its second end 41 to second equalizer beam 26 through a bracket support 52. A torque tube assembly 42 is connected at its opposite ends to first and second frame portions 12,14 by torque links 44,46, respectively. A shaft-like crossbeam member 48 extends through torque tube 42 and is pivotally connected at its opposite ends to equalizer beams 16,26. First bracket support 50 is retained adjacent first equalizer beam 16 by engagement with crossbeam member 48 for receiving second end 36 of first bracket 32 and, similarly, a second bracket support 52 is retained adjacent second equalizer beam 26 by engagement with crossbeam 48 for receiving second end 41 of second bracket 38. The second end 36 of first bracket 32 is resiliently connected to first equalizer beam 16 by compressible, resilient cushion suspension members 54,56 and, similarly, the second end 41 of second bracket 38 is resiliently connected to second equalizer beam 26 by compressible, resilient cushion suspension members 58,60. A third frame portion such as I beam member 62 interconnects first and second spaced frame portions 12,14, respectively. A first torque rod member 64 interconnects I beam 62 and tandem axle 22 and, similarly, a second torque rod member 66 interconnects I beam 62 and tandem axle 24.

More specifically now, in FIGS. 1 and 3, suspension system 10 is provided on a vehicle including spaced, substantially parallel first and second frame portions 12,14, respectively, interconnected by a third transversely disposed frame portion preferably comprising a steel I beam 62 bolted by bolts 63 at opposite first and second ends 68,70 to first and second frame portions 12,14. First and second tandem axles 22,24 each have wheels mounted on opposite ends thereof. First axle 22 includes wheels 72,74 mounted on its first and second ends, respectively, and, similarly, second axle 24 includes wheels 76,78 mounted on its first and second ends. Axle 22 includes axle housing 80 having a main drive shaft 82 connected to be driven by a transmission (not shown). Also, connecting drive shaft 84 (shown in broken section) extends from axle housing 80 to axle 22 to axle housing 86 of axle 24.

Equalizer beam 16 has its first end 18 connected preferably by spherical bearings (not shown) to axle bracket 88 of axle 22 which extends downwardly from axle 22 between the extending tines of forked end 18 of beam 16. Threaded pin 90 extends through beam 16 and bracket 88 and is maintained in position by nuts 92,94, FIGS. 3 and 4. Similarly, forked second end 20 of beam 16 is spherical bearing connected to axle bracket 96 of axle 24 by threaded pin 98 and nuts 100,102. Also, second equalizer beam 26 has its first end 28 spherical bearing connected to axle bracket 104 of axle 22 which extends downwardly from axle 22 between the tines of forked end 28 of beam 26. Threaded pin 106 extends through beam 26 and bracket 104 and is maintained in position by nuts 108,110. Similarly, forked second end 30 of beam 26 is spherical bearing connected to axle bracket 112 of axle 24 by threaded pin 114 and nuts 116,118. As best shown in FIG. 4, beams 16,26 have a widened central portion 122 including an oblong opening 126 formed therein. The equalizer beams are generally well known and are preferably formed of a fabricated suitable metal. The specific configuration of such equalizer beams may be modified to suit the particular application.

Bracket 38 is preferably of steel plate and includes first and second vertical plates 158,160 having flanges 157 bolted at 159 to frame 14 at first end 40 and extending downwardly to welded connection with horizontal plate 162, FIG. 1. Third and fourth plates 164,166 are preferably welded at an angle with respect to horizontal plate 162, as best shown in FIG. 2. First and second ribs 168,170 include flanges 167 preferably bolted at 169 to frame 14 and welded to plates 158,160 and extend downward to welded connection with plate 162. Third and fourth ribs 172,174 are also welded to plate 162 and to plates 164,166 and extend downwardly to converge with plates 164,166 at second end 41 where spaced bracket extension rods 176,178 extend to terminate at threaded ends 180,182. An opening 184 is maintained between ribs 168,170 above plate 162 and a similar opening 186 is maintained between ribs 172,174 below plate 162 which opening extends downwardly between spaced rods 176,178. The openings accommodate resilient cushion member 58 and 60 which resiliently connect bracket 38 to bracket support 52 via rod 216. Brackets 32 and 38 are correspondingly similar, thus, bracket 32 is not described in repetitive detail. Bracket 32 is bolted at 159 and 169 to frame 12 at first end 34 and extends downwardly and accommodates resilient cushion members 54,56 which resiliently connect bracket 32 to bracket support 50 via rod 214.

Bracket supports 50,52 are correspondingly similar and are preferably of a suitable fabricated metal. The bracket supports are generally oblong and are retained in oblong openings in the widened central portion of the equalizer beam such as bracket support 52 in opening 126 of equalizer beam 26, FIG. 4. Each bracket support includes a transverse annular bore therethrough such as bore 188 of bracket support 50 and bore 190 of bracket support 52 for accommodating crossbeam 48, FIG. 2. Each bracket support includes spaced vertically extending bores for receiving the spaced extension rods 176,178 at the second end of each bracket. This is best illustrated at FIG. 4 where support bracket 52 includes bores 196,198 for receiving resilient press fit bushings or inserts 199 each comprising concentric tubular portions such as steel inner and outer portions 200,202 sandwiching resilient medium or portion 201. Such inserts are well known and are readily available. Inner portions 200 slidingly receive spaced extension rods 176,178 of bracket 38 which are secured at their lower threaded ends 180,182 by nuts 204,206, see FIG. 1. Plate 208 is connected to share loads imposed on rods 176,178 to assist in retaining inserts 199 in place and to limit excessive downward movement of bracket support 52. Similarly, plate 210 functions in connection with bracket 32. Each bracket support may include vertically extending raised portion such as raised portions 192,194 on bracket supports 50,52, respectively, see FIG. 2. The raised portions include a threaded bore for receiving correspondingly threaded rods 214,216, best shown in FIG. 1, where rod 216 is threaded at 234 to engage bracket support 52. Each bracket support 50,52 carries resilient vertical cushion suspension members secured thereto by rods 214,216.

Resilient cushion suspension members 54,56 are preferably of a suitable resilient material such as rubber or the like. Resilient member 54, FIG. 2, rests on plate 132 and has an axial bore 218 for accommodating rod 214. Resilient member 56 is between plate 132 and bracket support 50 and includes axial bore 220 for accommodating rod 214. Similarly, resilient member 58 rests on plate 162 of bracket 38 and has an axial bore 222 for accommodating rod 216. Resilient member 60 is between plate 162 and bracket support 52 and includes axial bore 224 for accommodating rod 216.

Rod 214 includes cap 226 engaging plate 228. The rod then extends downwardly through plate 228, through bore 218 of resilient member 54, through an accommodating bore in plate 132, through bore 220 in resilient member 56 and terminates in threaded engagement at 237 with bracket support 50. Similarly, rod 216 includes cap 230 engaging plate 232. The rod then extends downwardly through plate 232, through bore 222 of resilient member 58, through an accommodating bore in plate 162, through bore 224 of resilient member 60 and terminates in threaded engagement at 234 with bracket support 52. In this manner, brackets 32,38 are resiliently connected to their respective equalizer beams 16,26.

Preferably, well known vertical dampers 236,238 are resilient but relatively more stiff than the vertical resilient cushion suspension members 54,56,58,60. Damper 236 is connected at its first end 240 to frame portion 12. Damper receptacle 242 is secured to extend from frame 12 to receive end 240 of damper 236, see FIG. 2. Second end 244, of damper 236, is secured to cap 226 of rod 214 at damper receptacle 246. Similarly, damper 238 is connected at its first end 248 to frame portion 14. Damper receptacle 250 is secured to extend from frame portion 14 to receive end 248 of damper 238. Second end 252, of damper 238, is secured to cap 230 of rod 216 at damper receptacle 254.

Torque tube assembly 42 generally includes torque tube 256, preferably a rolled steel tube, and is rigidly connected, by welding or the like, at its opposite ends 258,260 to torque arms 262,264, FIGS. 1, 2, 4. The torque arms are preferably ball and socket connected at 266, 268 to torque links 44,46 which, in turn, are ball and socket connected at 265,267 to brackets 32,38, respectively.

Crossbeam 48, FIGS. 1-4, is preferably a rolled steel rod and is pivotally sleeve bearing mounted in the equalizer beams such as at bearings 271,273, FIG. 4, and includes opposite threaded ends 270,272 secured to equalizer beams 16,16 by nuts 274,276. The crossbeam extends from first end 270 through equalizer beam 16, through bore 188 of bracket support 50, through torque tube 256, through bore 190 of bracket support 52 and terminates at second end 272. In this manner, each bracket support 50,52 is retained adjacent its respective equalizer beam 16,26 by engagement with crossbeam 48 for receiving the second ends 36,41 of the respective brackets 32,38.

Torque rod 64 is well known and preferably formed of a suitable steel. Rod 64 is ball and socket connected, at its first end 278, to axle housing 80 and ball and socket connected at its second end 280 to I beam 62. Similarly, torque rod 66 is ball and socket connected, at its first end 282, to axle housing 86 and ball and socket connected at its second end 284 to I beam 62.

In operation, anti-roll stiffness is provided to a vehicle due to brackets 32,38 connected to equalizer beams 16,26, due to the interconnection of th e equalizer beams by crossbeam 48, and due to torque tube assembly 42 interconnecting beam 48 with the vehicle frame portions 12,14. Vertical softness or cushioning is provided due to the provision of compressible vertical resilient cushion members 54,56,58,60 interconnecting the vehicle frame portions 12,14 with the axles 22,24 and due to relatively stiff, vertical, resilient dampers 236,238 provided to compensate for the vertical cushioning of the resilient cushion members. Additionally, axle positioning and tracking are improved. This is accomplished by resiliently connecting the bracket to the equalizer beam through the use of inserts. More importantly, that resilient connection is made at a portion of the equalizer beam which lies on a line connecting the opposite ends of the beam which are connected to the tandem axles. For example, equalizer beam 26 is connected at its opposite ends to tandem axles 22,24, respectively, and rods 176,178 of bracket 38 resiliently connect to beam 26 through inserts 199.

The foregoing has described a suspension system for heavy duty tandem axle vehicles having sufficient stiffness and anti-roll characteristics and also having vertical softness or cushioning for good ride characteristics.

The embodiments of the invention in which an exclusive property or privilege is claimed are defined as follows:

1. A suspension system for tandem axle vehicles, comprising:
    a first equalizer beam connected at opposite ends thereof to the tandem axles;
    a second equalizer beam spaced from the first equalizer beam and connected at opposite ends thereof to the tandem axles;
    first and second spaced frame portions of the vehicle;
    a first bracket rigidly connected at a first end thereof to the first frame portion of the vehicle and resiliently connected at a second end thereof to the first equalizer beam;
    a second bracket rigidly connected at a first end thereof to the second frame portion of the vehicle and resiliently connected at a second end thereof to the second equalizer beam;
    a torque tube assembly connected at opposite ends thereof to the frame portions; and
    a crossbeam member connected at opposite ends thereof to the first and second equalizer beams and extending through the torque tube assembly.

2. The suspension system of claim 1, further comprising:
    first bracket support means retained adjacent the first equalizer beam by engagement with the crossbeam member for receiving the second end of the first bracket; and
    second bracket support means retained adjacent the second equalizer beam by engagement with the crossbeam member for receiving the second end of the second bracket.

3. The suspension system of claim 2, wherein:
    the second end of the first bracket is resiliently connected to the first equalizer beam by a plurality of resilient suspension members interconnecting the first bracket and the first bracket support means; and
    the second end of the second bracket is resiliently connected to the second equalizer beam by a plurality of resilient suspension members interconnecting the second bracket and the second bracket support means.

4. The suspension system of claim 1, further including:
    a third frame portion interconnecting the first and second spaced frame portions.

5. The suspension system of claim 4, further including:
    a first torque rod member interconnecting the third frame portion and one of the tandem axles; and
    a second torque rod member inerconnecting the third frame portion and another of the tandem axles.

6. The suspension system of claim 1, further comprising:
    resilient inserts interconnecting the second end of each bracket to its respective equalizer beam substantially in line with opposed ends of the equalizer beam.

* * * * *